M. J. SANDIN

May 19, 1931. FUSE MECHANISM Re. 18,073

Original Filed Oct. 25, 1921 3 Sheets-Sheet 1

WITNESSES:

Fred. C. Wilhem

J. H. Kendig

INVENTOR

Maurits J. Sandin

BY

Wesley G. Carr

ATTORNEY

M. J. SANDIN

May 19, 1931. FUSE MECHANISM Re. 18,073

Original Filed Oct. 25, 1921 3 Sheets-Sheet 2

WITNESSES:

Fred L. Williams

J. H. Kendig

INVENTOR

Maurits J. Sandin

BY

Wesley G. Carr

ATTORNEY

M. J. SANDIN

May 19, 1931. FUSE MECHANISM Re. 18,073

Original Filed Oct. 25, 1921 3 Sheets-Sheet 3

WITNESSES:
Fred C. Wilkes
J. H. Keuling

INVENTOR
Maurits J. Sandin
BY
Wesley G. Carr
ATTORNEY

Reissued May 19, 1931

Re. 18,073

UNITED STATES PATENT OFFICE

MAURITS J. SANDIN, OF WILKINS TOWNSHIP, ALLEGHENY COUNTY, PENNSYLVANIA, ASSIGNOR TO WESTINGHOUSE ELECTRIC & MANUFACTURING COMPANY, A CORPORATION OF PENNSYLVANIA

FUSE MECHANISM

Original No. 1,684,518, dated September 18, 1928, Serial No. 510,280, filed October 25, 1921. Application for reissue filed September 17, 1930. Serial No. 482,630.

My invention relates to fuse mechanism and particularly to enclosed expulsion fuses.

One object of my invention is to provide an expulsion fuse that is adapted for use in high-potential circuits of large capacity and which may be secured to conductor-supporting poles.

Another object of the invention is to provide a fuse mechanism, having the above characteristics, wherein replacements may be quickly and safely made.

Another object of my invention is to provide an expulsion fuse wherein the fusible element is caused to be ruptured near the closed end of the receptacle and wherein the unfused portion of the fuse is blown bodily from the receptacle by the arc gases incident to the rupture of the fuse.

Another object of my invention is to provide an expulsion fuse that is equally effective for interrupting circuits under short-circuit and overload conditions. Usually, fuse devices that are capable of extinguishing an arc under short-circuit conditions are incapable of properly extinguishing an arc of less violence caused by overload conditions.

Another object of my invention is to provide an expulsion fuse wherein the path of the arc is elongated between the terminals of the fuse and wherein the arc may be drawn to substantially three times the length of the distance between the terminals providing it is not previously extinguished, and wherein the cooling surface to which the arc is exposed is co-extensive with its length.

Another object of my invention is to provide an expulsion cartridge fuse of rigid and durable construction that shall withstand repeated violent explosions without appreciable deterioration and in which a refillable fusible element may be conveniently and quickly replaced.

Another object of my invention is to provide an enclosed expulsion fuse wherein the fuse cartridge is releasably attached to a door hinged adjacent the bottom of the housing and wherein the discharge end or muzzle of the cartridge projects into the discharge orifice in the bottom of the housing and thereby prevents back-firing into the housing.

Another object of my invention is to provide an expulsion fuse wherein a barrier is disposed between the terminals of the fuse for preventing arcing from one terminal to another.

Another object of my invention is to provide an expulsion fuse wherein a rigid insulating tube surrounds the fuse and telescopically fits within the main receptacle and is supported by the outer end of the fuse in such manner that, when the fusible element is ruptured within the insulating tube, arc gases discharge therefrom to melt the retaining portion of the fuse, thus releasing the tube and permitting it to be blown bodily from the receptacle and to increase the length of the arc in its movement out of the receptacle.

A further object of my invention is to provide a housing for an expulsion fuse that is made principally of wood and wherein metal bolts extending through the walls from edge to edge thereof serve both to join adjacent walls and to prevent warping of the wooden parts.

These and other objects, that will be made apparent throughout the further description of the invention, are attained by the expulsion-fuse construction hereinafter described, and illustrated in the accompanying drawings, wherein.

Figure 2:
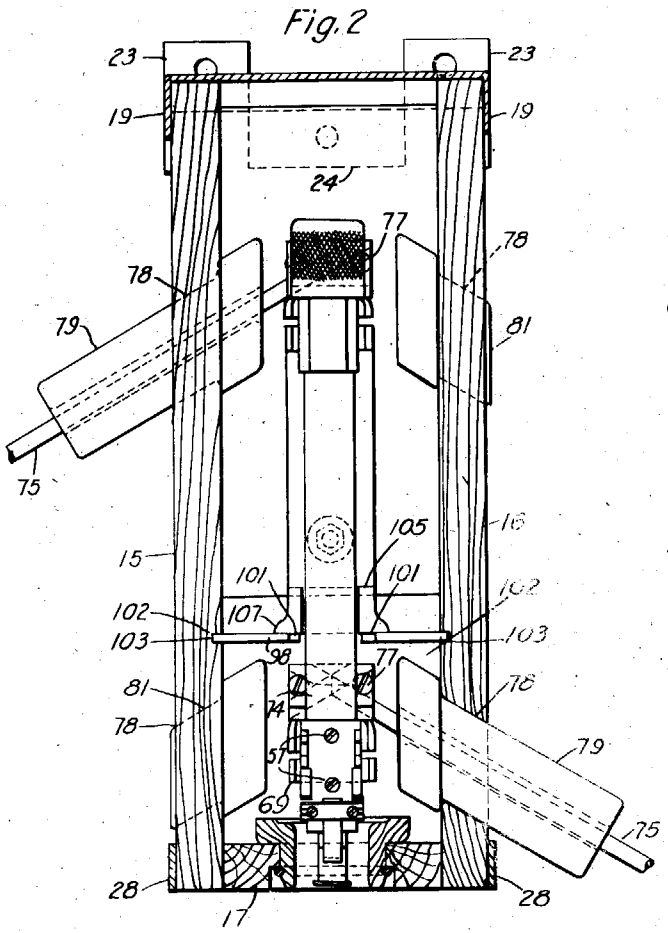
Fig. 2 is a front view of part of the apparatus shown in Fig. 1, the cover and fuse-cartridge support being removed.

Referring to the drawings, the apparatus includes a housing preferably made of wood and comprising a rear wall 14, side walls 15 and 16 and a bottom wall 17, all of which are made of wood, and a top wall 18 that comprises a flat piece of metal having flanges 19 overlapping the side walls. The top wall of the box is inclined for the purpose of shedding water and is provided with an extension 21 having attaching flanges 23 and 24 by means of which the box or housing may be secured to a wall. As illustrated, the box is attached to a cross arm 25 of a conductor-supporting pole (not shown) and is secured thereto by means of a lag bolt 26 which projects through a perforation in the extension 21.

The side and back walls are secured in assembled relation with bolts 27 which extend through the back and bottom walls from one side of the box to the other, and the lower portion of the box is re-inforced by metal plates 28 which extend slightly beyond the front edges of the side walls to constitute a hinge for the door 29. The upper front edges of the side walls are attached to the flanges of the top by means of short bolts 31.

The door 29 is made of wood and is hinged to the bottom of the box by means of the hinge pin 32 which extends through the door from one edge to the other and is mounted for rotation in the projecting ends of the metal straps 28. The bolts 27 and hinge pin 32 prevent warping of the housing walls and the door.

The door 29 is maintained in closed position by means of a movable latch handle 33 which is of U-shape and straddles the sides of the box. The handle is pivotally secured to the door by means of a bolt 34 which extends through the upper edge of the door from one side thereof to the other and prevents warping of the door. The free ends of the latch handle 33 are provided with latch projections 35 that are adapted to engage the rear faces of stops 36 that are struck outwardly from the flanges 19.

A leaf spring 37 is riveted to the handle 33 and yieldingly engages the door in such manner that the handle latches 35 are yieldingly retained in engagement with the stops 36. To open the door the handle is turned upwardly so that the latches 35 clear the stop members 36. The door may then be moved to open position.

Figure 3:
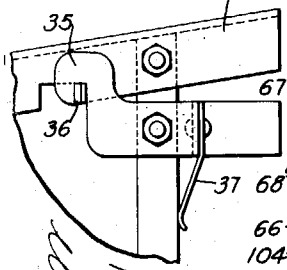
Fig. 3 is an elevational view of a fragment of apparatus similar to that illustrated in Fig. 1, showing a modified door-latch construction.

In Fig. 3, I have shown a modified form of handle structure wherein the latch 35 is disposed above the stop member 36 and is held in latching engagement by means of a leaf spring 37 in a manner similar to that of the spring previously described. In this case, the handle is moved downwardly in order to release the latch.

The bottom 17 of the housing is provided with a circular opening 38 in which an annular bushing 39, made of refractory material, such as porcelain, is inserted and retained in assembled relation with the bottom by means of a split ring 41. The bushing 39 is provided with a core 42 through which arc gases may be discharged from the expulsion fuse, as will be hereinafter described.

Figure 4:
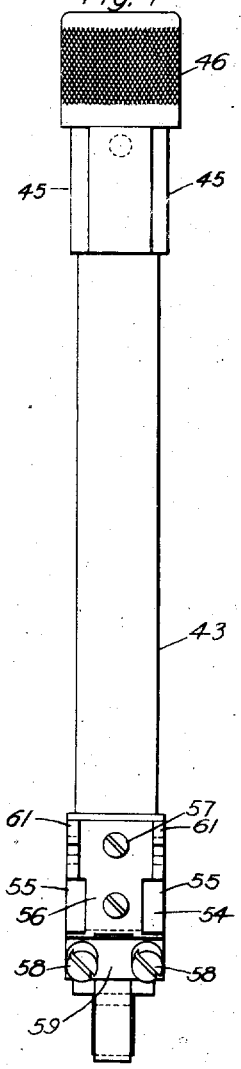
Fig. 4 is an elevational view of the fuse cartridge shown in Fig. 1.
Figure 5:
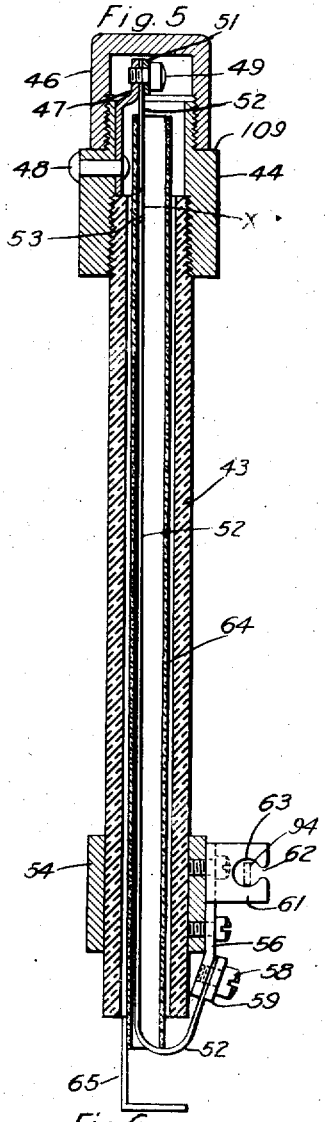
Fig. 5 is a longitudinal sectional view of the fuse cartridge shown in Fig. 4.

Referring particularly to Figs. 4 and 5, wherein the preferred form of expulsion fuse is illustrated, the fuse mechanism includes a tubular receptacle or casing 43 made of micarta or any preferred insulating material of sufficient strength to withstand high internal pressures.

One end of the casing is open and the other end thereof is threaded to receive a threaded metallic bushing 44 having flat parallel side surfaces 45. The other end of the bushing is threaded to receive a closure or cap member 46 which serves to securely close one end of the receptacle 43.

A fuse terminal 47 is secured to the bushing 44 by means of a rivet 48 and is provided with a pair of clamping screws 49 upon which a clamping plate 51 is mounted for the purpose of clamping a metallic fusible strip or fuse 52 to the terminal 47.

Figure 6:
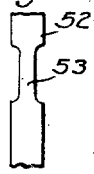
Fig. 6 is an elevational view of a fragment of the fuse strip.

The fuse strip comprises a flat strip of zinc or any preferred fusible metal having the desired point of fusion which is provided with a portion 53 having a reduced cross section, as indicated in Fig. 6, and located at the point X, Fig. 5.

Upon the open end of the receptacle 43, a contact bushing 54 is mounted having flat parallel side portions 55. A fuse-terminal member 56 is attached to the bushing 54 by means of screws 57 and is provided, at one end, with an extension having a pair of clamping screws 58.

A clamping plate 59 is mounted on the screws 58 which serves to clamp the outer end of the fuse 52 to the terminal 56 in a manner indicated in Fig. 5. The terminal 56 is provided with a pair of wings 61 that extend, at right angles, from the face of the terminal and are provided with a slot 62 having an enlarged circular portion 63 which serves as an element of a locking device for securing the fuse receptacle to its support.

As shown in Fig. 5, an insulating tube 64, which is preferably made of micarta, surrounds the fusible element 52 and telescopes within the receptacle 43 in such manner that it may freely move longitudinally thereof. The tube 64 is supported within the receptacle 43 by means of the lower end of the fuse strip 52. The inner end of the fuse strip 52 is provided with a portion of reduced cross section within, and adjacent to, the upper end of the tube 64 for the purpose of insuring that the fusible element will first rupture at the point X, causing the expansive gases of the arc to first exert pressure at the closed end of the fuse and to blow toward the open end of the receptacle.

Under short-circuit conditions in a high-capacity circuit, the explosion is violent and is substantially instantaneous. The gases are discharged from the receptacle 43 at a high velocity and impinge against an insulating stop member 65 that is secured to the outer end of the tube 64 and cause the tube and the remaining solid portion of the fuse strip 52 to be blown bodily from the receptacle at a high velocity.

As the tube leaves the receptacle, the arc incident to the rupture of the fuse follows the end of the tube 64 and, therefore, elongates the arc and so draws it way from the contact sleeve 54 that it is extinguished before the tube actually leaves the receptacle. As the tube 64 moves through the receptacle 43, the arc within the tube and within the receptacle is exposed to an increasing surface area which also assists to extinguish the arc by reason of its cooling effect.

By reason of this construction, the spark is extinguished almost instantly after the rupture of the fuse, and no damage can be done to apparatus in the circuit by reason of a short-circuit.

The provision of the tube 64 makes it possible to practically instantly extinguish the arc incident to the rupture of the fuse under overload conditions. It is a well known fact that, when a fuse is ruptured under such conditions, arc gases are generated slowly and, therefore do not generate high pressures.

Under overload conditions, the arc has a tendency to gradually melt the fusible element and the arc is sustained frequently between the terminals of the fuse after all of the fuse has been volatilized. Such conditions are frequently disastrous to transformers and apparatus connected in the circuit.

When the fuse illustrated in Fig. 5 is ruptured under overload conditions, the fusible strip is first melted at the point X and the arc gases are discharged from the open end of the tube 64 which, in passing the outer end of the fuse strip 52, causes it to be melted adjacent the outer end of the tube 64.

The pressure within the receptacle, while not being as high as that usually generated by a rupture caused by a short-circuit, is sufficient to blow the tube 64 bodily from the receptacle at a comparatively high velocity and thus stretch the arc circuit until it breaks before the inner end of the tube 64 has left the receptacle 43. The solid portion of the fuse strip between the point X and the outer end of the tube 64 is blown bodily from the receptacle with the tube 64.

Figure 1:
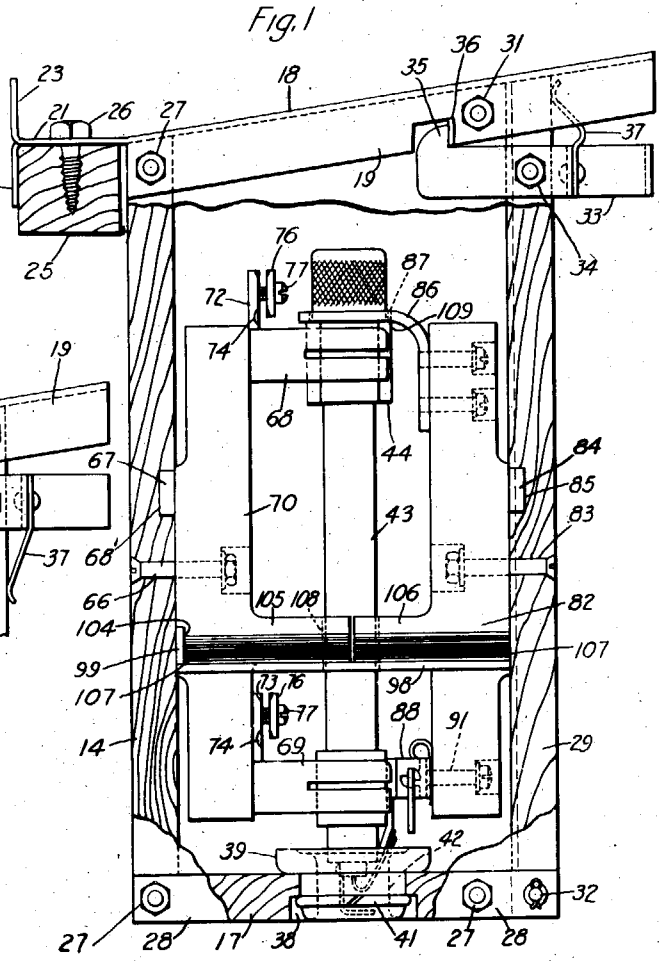
Figure 1 is a side elevational view of the complete enclosed expulsion-fuse mechanism, the side wall thereof being broken away to show the construction of interior elements.

Referring to Figs. 1 and 2, the rear wall 14 of the housing or box is provided with an insulating panel 70 made of porcelain or other highly refractory insulating material and is attached to the housing by means of a bolt 66. The panel is provided with a lug 67 which projects into a socket 68′ in the housing wall to prevent rotary movement of the panel about the axis of the bolt 66. Resilient fuse-jaw members 68 and 69 are attached to the panel 70, adjacent opposite ends thereof, by means of screws.

The fuse jaw members are provided with integral terminals 72 and 73 that are provided with intersecting conductor grooves 74 for receiving the exposed ends of insulated conductors 75 which are secured to the terminals 72 and 73 by means of clamping plates 76 that are secured to the terminals by means of screws 77.

The side walls of the housing are provided with inclined openings 78 through which insulating bushings 79 are inserted in alinement with the intersecting grooves 74. By reason of the provision of the intersecting grooves 74 and the inclined openings 78, conductors may be led into the box from either side, the openings 78, not in use, being closed by means of insulating plugs 81.

The door 29 is provided with an insulating panel 82 which is somewhat similar to the panel 70 and is secured to the door by means of a bolt 83. Rotation of the panel about the axis of the bolt 83 is prevented by a projection 84 on the panel which extends into a socket 85 in the door. The panel 82 is provided, at its upper end, with a bracket 86 having a circular opening 87 for receiving the upper end of the fuse cartridge illustrated in Fig. 5.

Figure 8:
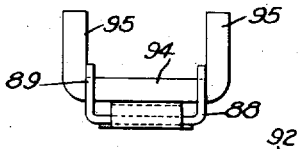
Figs. 8, 9 and 10 are elevational detail views of the locking mechanism for securing the fuse cartridge to its support.
Figure 9:
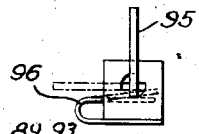
Figure 10:
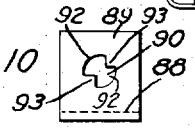

The lower end of the panel 82 is provided with a locking device (see Figs. 1, 2, 5, 8, 9 and 10). This device comprises a metallic bracket 88 having two wings 89 that project, at right angles, from the face of the panel 82. The bracket is attached to the panel by means of a bolt 91, and each wing is provided with a perforation 90 having oppositely disposed arcuate surfaces 92 separated by angular projections 93, as illustrated in Fig. 10.

A flat latch bar 94 of U-shape, having legs 95, is inserted within the perforation 90 in a manner indicated in Figs. 8 and 9. It will be seen that the latch bar 94 is capable of angular movement through 90°, the extreme limits of movement being indicated in Fig. 9 by the full-line position and the dotted line position of the latch bar projections or legs 95.

The latch bar 94 is yieldingly maintained in either of its extreme positions by means of a flat spring 96 of U-shape which is attached to the bracket 88 and which extends between the bar 94 and the body of the bracket 88, as indicated in Figs. 8 and 9. It will be seen that the angular projections 93 serve as stops for limiting the angular movement of the latch 94.

When it is desired to secure the fuse cartridge 43 to the insulating panel 82, the closed end of the receptacle is first passed through the opening 87 in the bracket 86. The latch bar 94 is moved to the open position shown in full lines in Fig. 9 wherein the edge of the bar 94 is presented to the slot 62 in the attaching bracket 61. Therefore, the brackets or wings 61 may be moved toward the base 82 until the bar 94 lies within the circular portion 63 of the slot 62. The receptacle 43 is then in its assembled relation with the support panel 82 and is locked therein by simply turning the latch bar 94 to the position indicated in dotted lines in Fig. 9, wherein the latch bar 94 is disposed within the opening 63 in the position indicated in dotted lines in Fig. 5 which prevents separation of the receptacle from the base.

When the receptacle 43 is in assembled relation with the base 82, the flat surfaces 45 of the bushing 44 and the flat surfaces 55 of the bushing 54 are in such positions that they will enter between the sides of the terminals 68 and 69, respectively, and be yieldingly engaged thereby when the door is moved to closed position, as illustrated in Fig. 1.

As the door rotates about the hinge pin 32, it will be seen that, when the door is closed, the open end of the receptacle 43 projects a short distance into the opening 42 of the bushing 39, thereby causing substantially all of the gases expelled from the fuse to be discharged through the opening in the bushing, the discharge serving as an ejector for air and gases within the box, thereby assisting to prevent the arc from flashing upwardly from the terminal bushing 44.

Figure 7:
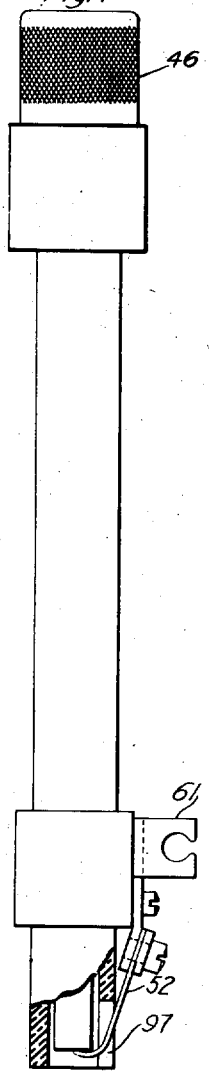
Fig. 7 is a side elevational view of a modified form of fuse cartridge.

While I have shown in Figs. 1, 2 and 5, a fuse construction in which the open end of the fuse receptacle projects only a slight distance into the bushing, it is obvious that the length of the receptacle may be extended to project entirely within the bushing and terminate flush with the outer end thereof. Such a fuse receptacle is illustrated in Fig. 7 and the receptacle is provided, at its open end, with a slot 97 through which the fuse strip 52 projects from the receptacle at a point between the ends thereof. By reason of this construction, no portion of the fuse strip 52 will project from the bushing and, consequently, there will be no danger of foreign objects coming in contact therewith.

As a precaution against flare-back or a flash of gases from the open end of the receptacle to the terminals of the fuse, an insulating barrier 98 is inserted within the housing between the fuse-jaw members 68 and 69. The barrier comprises a flat plate 98 of micarta or other suitable insulating material that is provided, at its rear end, with a flange 99 and a slot 101 that extends from the front edge of the barrier rearwardly to the flange 99 in such manner that the panels 70 and 82 are straddled by the barrier when the door 29 is in closed position.

The lateral edges 102 of the barrier are inserted in transverse grooves 103 cut in the side walls of the housing, and the flange 99 is mounted in a notch 104 provided in the rear face of the panel 70. By reason of this arrangement, no screws or bolts are required for securing the barrier in place.

In order to entirely close the space between the inner opposing faces of the panels 70 and 82, they are respectively provided with integral barrier-like extensions 105 and 106 that are provided with flanges 107 that overlap the inner edges of the barrier 98 and close all communication between the upper and lower portions of the housing. The barriers 105 and 106 meet at the central longitudinal plane of the receptacle 43 and are provided with semi-circular notches 108 which, when the door 29 is closed, as indicated in Fig. 1, combine to form a circular opening through which the receptacle 43 extends.

It will be seen from the foregoing that the box or housing is divided by the barrier 98 and the barrier extensions 105 and 106 into a lower compartment containing the lower fuse-jaw members and terminals and an upper compartment containing the upper fuse-jaw members and terminals which, when the door is closed, are completely separated from one another and it is, therefore, impossible for any gases flaring from the open end of the receptacle to be blown into the vicinity or make contact with the upper terminals.

When the fuse receptacle 43 is in assembled relation with the panel 82, a shoulder 109 on the bushing 44 engages the bracket 86 in such manner that the recoil, incident to the explosion of the fuse, is absorbed by the bracket 86, and the fuse is thereby retained in operative position.

Figure 11:
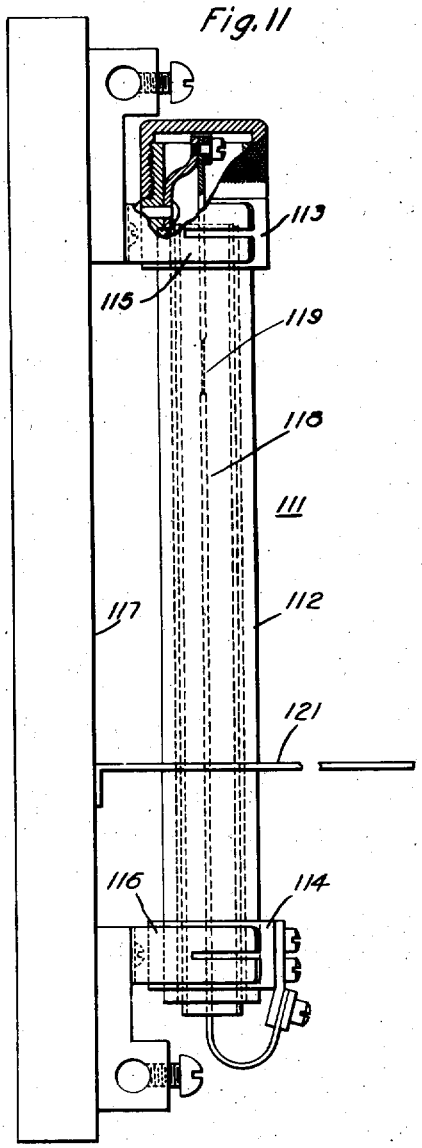
Fig. 11 is an elevational view of a modified form of fuse mounting.
Figure 13:
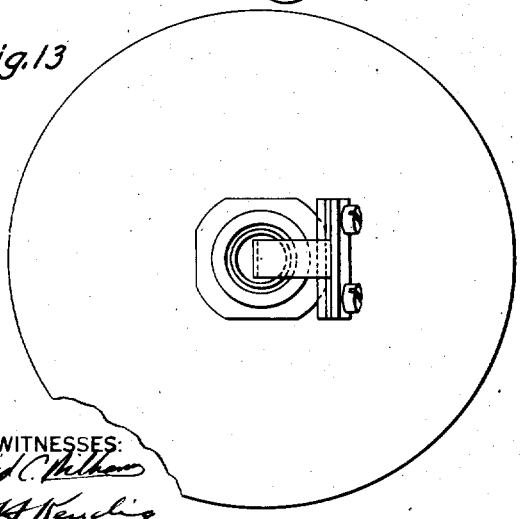
Fig. 13 is a plan view of the device shown in Fig. 12.

Referring to Fig. 11, I have shown an expulsion fuse somewhat similar in construction to the fuse previously described except that the fuse is designed to be mounted in the open or in places where a housing is not expedient or necessary. The fuse 111 comprises a receptacle 112 having terminals 113 and 114 that are adapted to be supported between fuse-jaw members 115 and 116, respectively. The fuse-jaw members are attached to an insulating support 117.

The fuse strip 118 is provided with a portion 119 of reduced sectional area that is disposed near the closed end of the cartridge, as shown in Fig. 11.

In order to prevent the arc, incident to the rupture of the fusible strip, from expanding into the vicinity of the upper terminal 113, a flat insulating barrier 121 is secured to the support 117 near the open end of the fuse and extends laterally in all directions in a plane transverse to the axis of the fuse. The size of the barrier may be varied in accordance with the capacity of the fuse.

Figure 12:
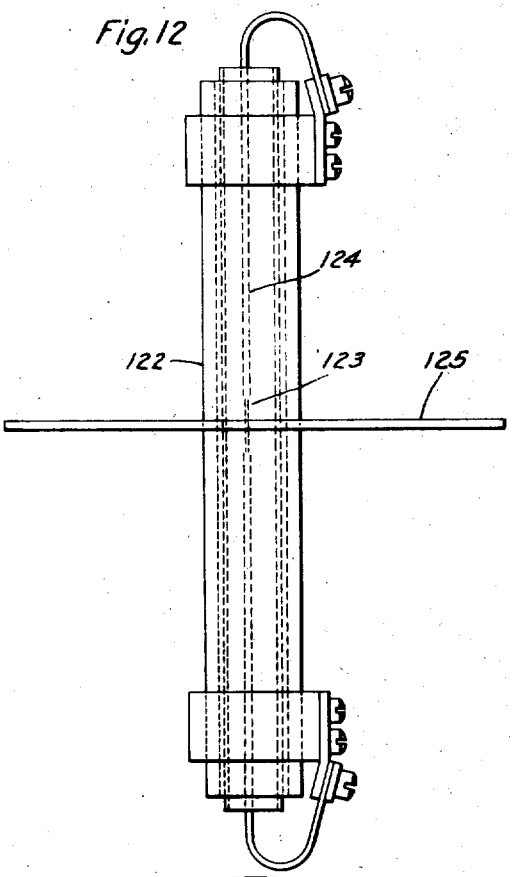
Fig. 12 is an elevational view of a modified form of fuse cartridge.

In Fig. 12, I have shown a modified form of expulsion fuse wherein both ends of the cartridge 122 are open and wherein a portion 123 of the fuse strip 124, having a reduced sectional area, is disposed mid-way between the open ends of the cartridge. This fuse is adapted to be inserted in fuse-jaw members similar to those illustrated in Fig. 11.

In order to prevent the arc gases, incident to the rupture of the fuse, which are expelled in this case from both ends of the cartridge, from expanding toward the terminals, a flat barrier 125 of circular shape is secured to the cartridge mid-way between the open ends thereof and serves to increase the length of the path between the terminals of the fuse. The diameter of the barrier 125 may be varied in accordance with the capacity of the fuse.

While I have illustrated and described several embodiments of my invention, it will be apparent to those skilled in the art that various changes, modifications, substitutions, additions and omissions may be made in the apparatus illustrated without departing from the spirit and scope of my invention, as set forth in the appended claims.

I claim as my invention:

1. An expulsion fuse comprising a tubular receptacle closed at one end, a fusible element within the receptacle and supported at opposite ends of the receptacle and having a portion adjacent the lower end thereof extending transversely across the mouth of the tube and in the path of arc gases discharged from the receptacle whereby the end of the fuse adjacent the open end of the receptacle is fused by arc gases discharged from the receptacle, a tubular shield surrounding the fusible member and supported within the receptacle by the fusible member and means for causing the fusible element to rupture at a predetermined point within the receptacle in response to a predetermined current.

2. An expulsion fuse comprising a plurality of relatively movable tubular telescoping receptacles, the outermost receptacle being substantially closed at one end and having its other end open to the atmosphere, and the innermost receptacle being open at both ends, and a fusible element for releasably holding the receptacles in telescoped position and adapted to release the interior receptacle when the fuse is ruptured, the said element being provided adjacent its inner end with means for localizing the initial point of rupture of the element near the closed end of the outermost receptacle.

3. In combination, in an expulsion fuse, a pair of separate terminal members, a fusible element for connecting the members and a casing open at one end only for the expulsion of arc gases and for enclosing the fusible element, and adapted to be elongated by the arc gases incident to rupture of the fusible element, for increasing the length of the path of the arc between the terminals, the said fusible element being provided with means for insuring initial rupture thereof adjacent to the closed end of the casing.

4. The combination with a pair of separate fixed terminal members, a tubular casing having one end closed and a fusible element within the casing for connecting the terminal members and having means adjacent the closed end of the casing for localizing the initial rupture of the element near the closed end of the casing, of a means including a tube open at both ends and disposed for longitudinal movement with respect to the casing for increasing the length of the path of the arc between the terminal members.

5. An expulsion fuse comprising a tubular receptacle closed at one end, separate terminal members disposed at opposite ends of the receptacle, a fusible element within the receptacle, a housing enclosing the receptacle and having an opening registering with the open end of the receptacle through which arc gases are expelled and a barrier within the housing and surrounding the receptacle and extending transversely of the housing intermediate the said terminal members.

6. A fuse device comprising a tubular receptacle open to the atmosphere, separate terminal members disposed at opposite ends of the receptacle, a fusible element within the receptacle, a housing enclosing the receptacle and a barrier extending transversely of the housing between the said terminal members for preventing a flash-over between the terminals when arc gases are expelled from the receptacle.

7. An expulsion fuse device comprising a housing having a perforate bottom wall, a cover hinged to the housing, a tubular bushing in the said opening and an expulsion fuse mounted on the cover and so disposed thereon that the open end of the fuse projects into the said bushing when the door is in closed position.

8. An expulsion fuse device comprising a housing having a hinged door for the housing, an expulsion fuse mounted on the door and provided with separate contact members, separate terminal members mounted in the housing for engaging the contact members on the fuse when the door is in closed position and a barrier disposed transversely of the housing between the said terminal members and surrounding the said fuse.

9. An enclosed expulsion fuse comprising a housing, a movable door therefor, an insulating panel mounted in the housing having a barrier member projecting therefrom, separate fuse jaw terminal members mounted on the panel, a fuse-supporting panel mounted on the door and having a barrier projecting therefrom adapted to register with the barrier on the first panel, an expulsion fuse mounted upon the second panel and adapted to be surrounded by the said barriers when the door is in closed position, a third barrier secured to the housing and adapted to co-operate with the first and second barriers for constituting a transverse barrier for dividing the housing into separate compartments, each containing one of the said separate terminal members.

10. The combination with an enclosed expulsion fuse comprising a housing, a hinged door for the housing, fuse-jaw terminals within the housing and an expulsion fuse mounted on the door and movable into engagement with the fuse-jaw terminals, of a pair of co-operating barrier members, one of which is secured within the housing and the other secured to the door for constituting a closed barrier between the said fuse-jaw members when the door is in closed position.

11. Fuse mechanism comprising a fuse member having a socket member disposed at one end thereof, and a support comprising a base member having a perforate bracket thereon for receiving one end of the fuse in the perforation to prevent lateral displacement thereof, and a latch member on the support for engaging the socket member on the fuse for preventing both longitudinal and lateral displacement of the fuse.

12. An expulson fuse comprising a tubular receptacle closed at one end, terminal members for the receptacle, a fusible element within the receptacle, a housing enclosing the receptacle and having an opening registering with the open end of the receptacle through which arc gases are expelled and a barrier within the housing and surrounding the receptacle and extending transversely of the housing.

13. An expulsion-fuse device comprising a housing having a hinged door for the housing, an expulsion fuse mounted on the door and provided with separate contact members, separate terminal members mounted in the housing for engaging the contact members on the fuse when the door is in closed position and a barrier disposed transversely of the housing and surrounding the said fuse.

14. An expulsion fuse comprising a plurality of relatively movable tubular telescoping receptacles, one of which is subsantially closed at one end and having the other end open to the atmosphere and the other of which is open at both ends and a fusible element having means for insuring initial rupture thereof adjacent the closed end of the first receptacle for releasably holding the receptacle in telescoped position and adapted to release the second receptacle when the fuse is ruptured.

15. A fuse comprising a pair of telescopically slidable tubes, the outer tube being open at one end only and the inner tube being open at both ends and having its outer end normally open to the atmosphere, a pair of spaced terminals mounted on the outside of the outer tube, a fuse element passing through the inner tube and having its outer end secured to a terminal and its inner end provided with a means for insuring rupture of the element adjacent the closed end of the outer tube, the pressure of gas within the inner tube produced by the volatilization of said element causing the outer end portion of the inner tube to move out of the outer tube and positively interrupt the circuit.

16. An expulsion fuse comprising a tubular receptacle closed at one end and open at the other end, terminal members for the receptacle, a fuse element within the receptacle and connected to the terminal members, a housing enclosing the receptacle open at the end adjacent the open end of the receptacle and a barrier within the housing between the ends of the receptacle and surrounding the receptacle and extending transversely of the housing.

17. An expulsion fuse device comprising a housing having a movable door and having an opening at one end, an expulsion fuse within the housing having its open end adjacent the open end of the housing and provided with a terminal member, a transverse barrier within the housing between the ends of the expulsion fuse, and a transverse barrier carried by the door co-operating with the first said barrier to constitute a transverse barrier surrounding the expulsion fuse for protecting the terminal member from arc and gases expelled from the open end of the expulsion fuse.

18. An expulsion fuse comprising a pair of terminal members, a pair of tubular casings having their open ends adjacent one another, and a fusible element connecting the terminals and extending through the casings and out across the adjacent open ends of the tubular casings, so that heated gases expelled from a casing will move across the exposed portion of the fusible element and weaken it at that point, the said element having means for localizing the point of initial rupture within, and near the closed end of, one of the casings.

19. An expulsion fuse comprising a pair of terminal members, a pair of tubular casings arranged in parallel relation and having their open ends adjacent one another, and a fusible element of substantially U-shape connecting the terminals and extending through the casings and out across the adjacent open ends of the tubular casing so that heated gases expelled from a casing will move across the exposed portion of the fusible element and weaken it at that point, the said element having means for localizing the point of initial rupture within and near the closed end of one of the casings.

20. An expulsion fuse comprising a tubular receptacle closed at one end and open at the other end, a terminal for the closed end of the tube, a housing enclosing the receptacle and open at the end adjacent the open end of the receptacle, and a barrier within the housing between the open end of the receptacle and the said terminal and surrounding the receptacle and extending transversely of the housing.

21. A housing for an expulsion fuse provided with a door, a receptacle mounted on said door and a fusible element within said receptacle and extending beyond the confines of said housing.

22. A housing for an expulsion fuse having a perforated bottom and a door, a tubular receptacle mounted on the door, spaced contact members associated with said receptacle, spaced terminal members mounted on said housing engageable with said contact members and a fusible element within said receptacle and extending beyond the confines of the housing.

23. A housing for an expulsion fuse provided with an opening in one wall and with a door, a receptacle mounted on said door and a fusible element within said receptacle, and said receptacle having an open end extending beyond the inner edge of the housing at its wall opening.

24. In a circuit interrupter, a housing having a bottom wall with an opening therein, a door hinged to said housing adjacent said bottom wall, a fuse receptacle having an open end mounted on said door so that said open end extends into said opening in the bottom wall when the door is closed.

25. In a circuit interrupter, a housing having a bottom wall with an opening therein, spaced terminal members in said housing, a door hinged to said housing adjacent said bottom wall, a fuse receptacle having spaced contact members to engage said terminal members, said receptacle having an open end and being mounted on said door so that said open end extends into said opening in the bottom wall when the door is closed.

In testimony whereof, I have hereunto subscribed my name this 16th day of September, 1930.

MAURITS J. SANDIN.